United States Patent [19]

Allison, Jr. et al.

[11] 4,109,113

[45] Aug. 22, 1978

[54] COMMUNICATION SYSTEM OPTIMIZED POOLED LINE ARRANGEMENT

[75] Inventors: Charles Eugene Allison, Jr., Holmdel; Francis Michael Fenton, Middletown; Tse Lin Wang, Matawan; Carl Dennis Weiss, Little Silver, all of N.J.

[73] Assignee: Bell Telephone Laboratories, Incorporated, Murray Hill, N.J.

[21] Appl. No.: 847,214

[22] Filed: Oct. 31, 1977

[51] Int. Cl.² ............................................. H04Q 3/64
[52] U.S. Cl. .................................... 179/99; 179/27 D
[58] Field of Search ............ 179/27 D, 18 HA, 18 G, 179/18 AD, 18 E, 99, 18 B

[56] References Cited

U.S. PATENT DOCUMENTS

| | | | |
|---|---|---|---|
| 4,048,452 | 9/1977 | Oehring et al. | 179/27 D |
| 4,066,847 | 1/1978 | Giordano | 179/99 |

Primary Examiner—Thomas W. Brown
Attorney, Agent, or Firm—David H. Tannenbaum

[57] ABSTRACT

There is disclosed a communication system arrangement whereby the efficiency with which pooled facilities are used can be increased by reducing the number of lines that are dedicated to the pool. This is accomplished by making available to the pool, on a priority basis, lines that have been installed for other purposes, such as, for example, conference lines and private two-way lines. The system is arranged such that dedicated pooled lines have a higher priority than other lines which are available to the pool on a decreasing priority basis. In addition, each pooled set of lines at each station is given a visual indication using the system available lamp to indicate whether an idle line remains in the pool. This arrangement allows each station user to determine, without unnecessary seizure attempts, whether or not an available line exists in the pool.

13 Claims, 6 Drawing Figures

COMMUNICATION SYSTEM OPTIMIZED POOLED LINE ARRANGEMENT

BACKGROUND OF THE INVENTION

This invention relates to a communication system having improved line pooling arrangements.

In situations where many stations may share access to a common pool of lines such as WATS lines, tie trunks, FX lines, or "outside" lines, it is desirable for the subscriber to determine prior to going off-hook whether or not there is an available line in the pool. Presently this information is available to central attendants who typically control access to pooled lines for a group of stations. In situations where it is desired to eliminate the attendant operation, it is desirable to provide each station having access to the pool with information concerning the busy-idle condition of the pool without requiring the station to first request service from the pool.

A further problem is to optimize the efficiency of the line pool such that utilization of the pooled lines is increased.

Increased utilization might be attempted by permitting a group of lines to be used as a pool for outgoing service from the communication system to the local central office, and, in addition, as a Listed Directory Number pool for use by the Central Office as the hunting group to the communication system. Such lines would then appear at the Central Answering Position for incoming business calls. A problem arises if such lines do not have glare protection protocol implemented on a per-trunk basis. Incoming calls may be inadvertently answered by a station attempting to seize an idle outgoing line.

These problems are compounded in situations where lines are available for individual use, but could also be available for "pooled" use if the need arose. Since each telephone station set having access to a pooled group of lines has different "other" lines appearing on the other buttons, simply combining the lines at the other buttons with the pooled group of lines would lead to confusion and improper telephone line usage.

Accordingly, it is a general object of our invention to provide a communication system having a high usage of common lines while also providing busy-idle indications of the lines in the pool prior to a subscriber going off-hook.

SUMMARY OF THE INVENTION

These and other objectives are accomplished in a telephone communication system by reducing the number of lines that are in the pool by making available to the pool, on a priority basis, lines that have been installed for other purposes, such as, for example, conference lines and private two-way lines. The system is arranged such that dedicated pooled lines have a higher priority than other lines which are available to the pool on a decreasing priority basis. Also, lines in the first priority pool are selected by the system in a prescribed hunting order sequence which may be selected (at time of installation) to be opposite to the order used by the central office. All such lines may, therefore, be terminated at the Central Answering Position and used for incoming Listed Directory Number Service provided by central office hunting, with very low probability of seizing an outgoing line to which an incoming call has just been assigned. In addition, each pooled set of lines at each station is given a visual indication using the system available lamp to indicate whether an idle line remains in the pool. Thus, without going off-hook and unnecessarily tying up system facilities, a station user may determine the busy-idle condition of the pool.

Thus, it is a feature of our invention to provide a pooled facility which allows higher density usage of the pool by making available to the pool other lines on a priority basis when the pooled lines are all busy. Also, it is a feature of our invention to use the system available lamp to indicate busy-idle states of the pooled lines to on-hook stations.

DESCRIPTION OF THE DRAWINGS

The foregoing features and objectives together with the operation and utilization of the present invention will be more apparent from the following description, taken in conjunction with the drawing, in which.

GENERAL DESCRIPTION — BACKGROUND

Before beginning a general discussion of the specific features claimed it may be helpful to review in general terms the operation of an overall system in which the claimed feature can be utilized. It should be borne in mind that such a feature can be used in any number of similar type systems and thus only background information on one type of system will be presented. In addition, since communication system features may be used with different types of systems each dependent on different hardware constraints and upon different programming techniques, no attempt will be made to detail the entire program used to control the overall system, as such would cloud the issue and unnecessarily lengthen this specification. Quantities mentioned were engineered for particular time and memory requirements and will not be the optimum for all such systems.

It will, of course, be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein this patent specification will concentrate on providing an understanding of the problems and constraints typically found in a communication system where the feature may be used. The patent specification will provide the logical steps necessary for the implementation and blending of the described feature into such a larger system, having many such features.

This patent specification is being filed concurrently with three other patent specifications, each directed to a different operational feature of a communication system. These patent applications are Nahabedian et al., Ser. No. 847,215, filed on Oct. 31, 1977, Fenton et al., Ser. No. 847,216, filed on Oct. 31, 1977, and Fenton et al. Ser. No. 847,217, filed on Oct. 31, 1977, and are all incorporated by reference as though they were each reproduced in their entirety herein.

TYPICAL OVERALL SYSTEM OPERATION

Figure 1:
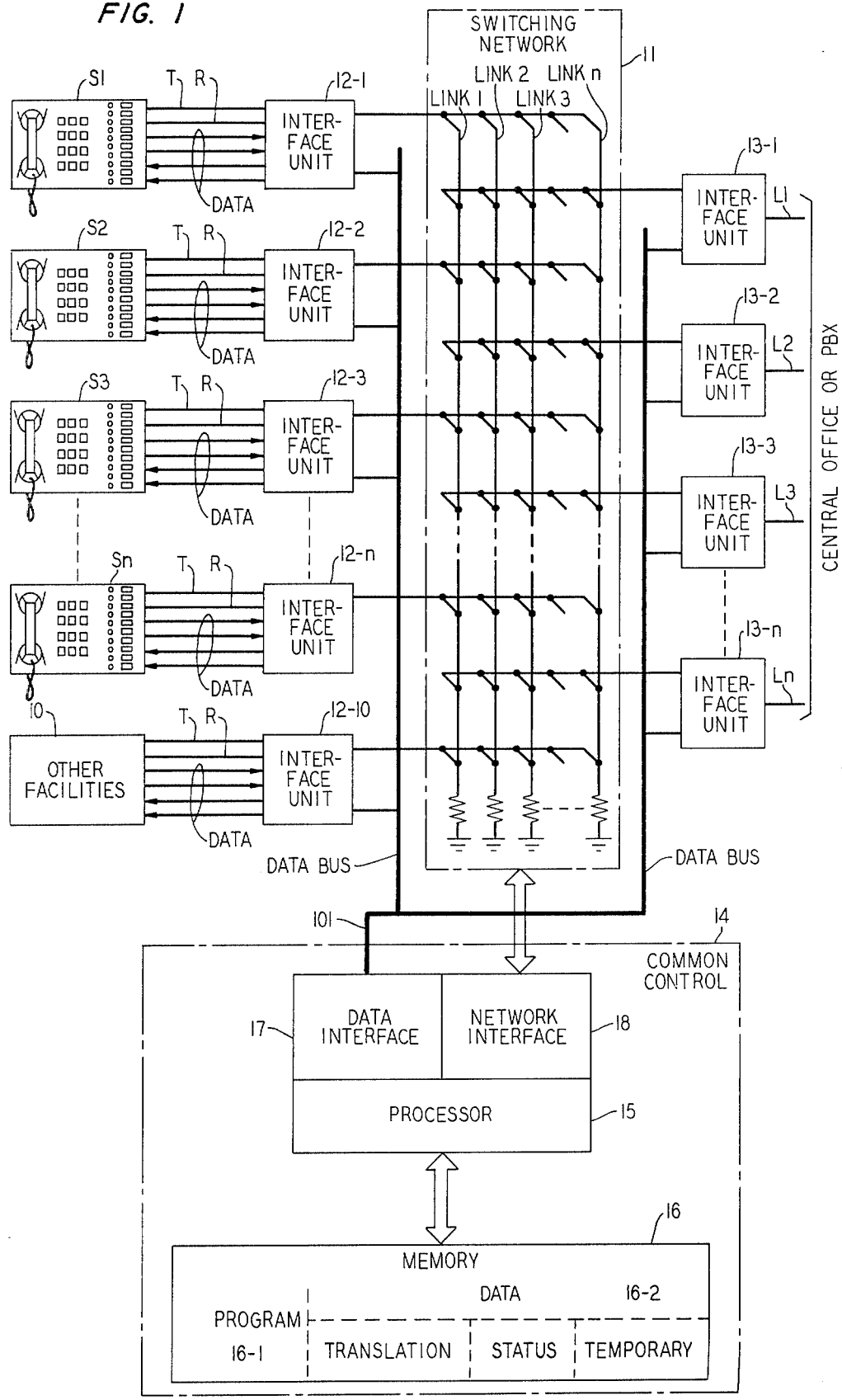
FIG. 1 shows an overall system configuration having several multibutton electronic telephone stations.

One such communication system where the structure claimed herein can be used is a station oriented, solid-state, stored program control, business communication system. FIG. 1 shows a block diagram of such a system which combines the usual key system features (holds, visual indication, etc.) with many new features not previously available.

Call processing in the system is under the control of a microprocessor 15 in common control 14. Each station such as station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals — low-pitched tone ringing to indicate incoming CO calls and high-pitched tone ringing to indicate incoming station-to-station (intercom) calls. The non-button key sets are used as station positions where only station-to-station (intercom) calling and/or outward dialing, via dial access pooled facilities or the CAP, are required. In this implementation the first (lower) four buttons on each MET station set are always the same. They are: Hold, +/−, and two System Access buttons, each associated with the intercom number of the particular station. The +/− feature is described in the aforementioned copending patent application of Fenton et al., Ser. No. 847,216. The System Access buttons are used to receive calls from other stations within the communication system (intercom) and to originate such calls or to access system facilities such as lines, paging ports, etc. Incoming calls may terminate on either System Access button depending on their busy-idle status. If the lower one is busy, a second incoming call comes to the second (upper) one, giving a visual call waiting indication, accompanied by a single audible ring if the station is off-hook. The System Access buttons are also used in conferencing and and call transfer features, described in the aforementioned copending patent application Nahabedian et al., Ser. No. 847,215. The remainder of the buttons on the MET station sets are flexible buttons and can be assigned to any of the button-activated station features such as call coverage.

As shown in FIG. 1 there are three pairs of wires coming out of the MET set to the interface unit: T&R, data in, data out. The T&R pairs are connected to switching network 11. In the example shown a space division network with $n$ links is shown. It may be replaced by a time division network with $n$ time slots. The data link between the set and the processor is used to transmit information to the processor which will configure the switching network and send LED control signals back to the telephone sets accordingly.

Common control 14 consists of processor 15, interface units 17 and 18 and memory 16. The memory unit consists of a program store 16-1, and a data store 16-2. The data store is subdivided into the following:

A. Translation which contains the hardware configuration data. For example, the button assignments and station class of service.
B. Status which stores the state of the system at a given moment. For the station, it contains
 (a) station state: switchhook; +/− operation; whether actively connected to the network or not,
 (b) button state: for each button
  (i) if I-USE is on
  (ii) what is the green status LED state
  (iii) which link is associated with calls on this button.
C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets flag and returns to the interrupted task which, in turn, will relinquish control to TSK-DSP control, as soon as it reaches a convenient break point. The task dispenser decides which task is to be executed next according to a schedule. Basically, these tasks fall into three categories:

(1) Scan: Scan for physical changes (e.g., a new button depression by a station). If a change is detected and confirmed, it will be stored in a temporary buffer to be processed later.
(2) Process: After all scans are completed, changes will be processed.
(3) Maintenance: If there is time left in the 25 MS cycle, the system will perform routine maintenance functions until the next work cycle begins.

The following features can be implemented by the system discussed herein.

I-USE INDICATION

Figure 2:
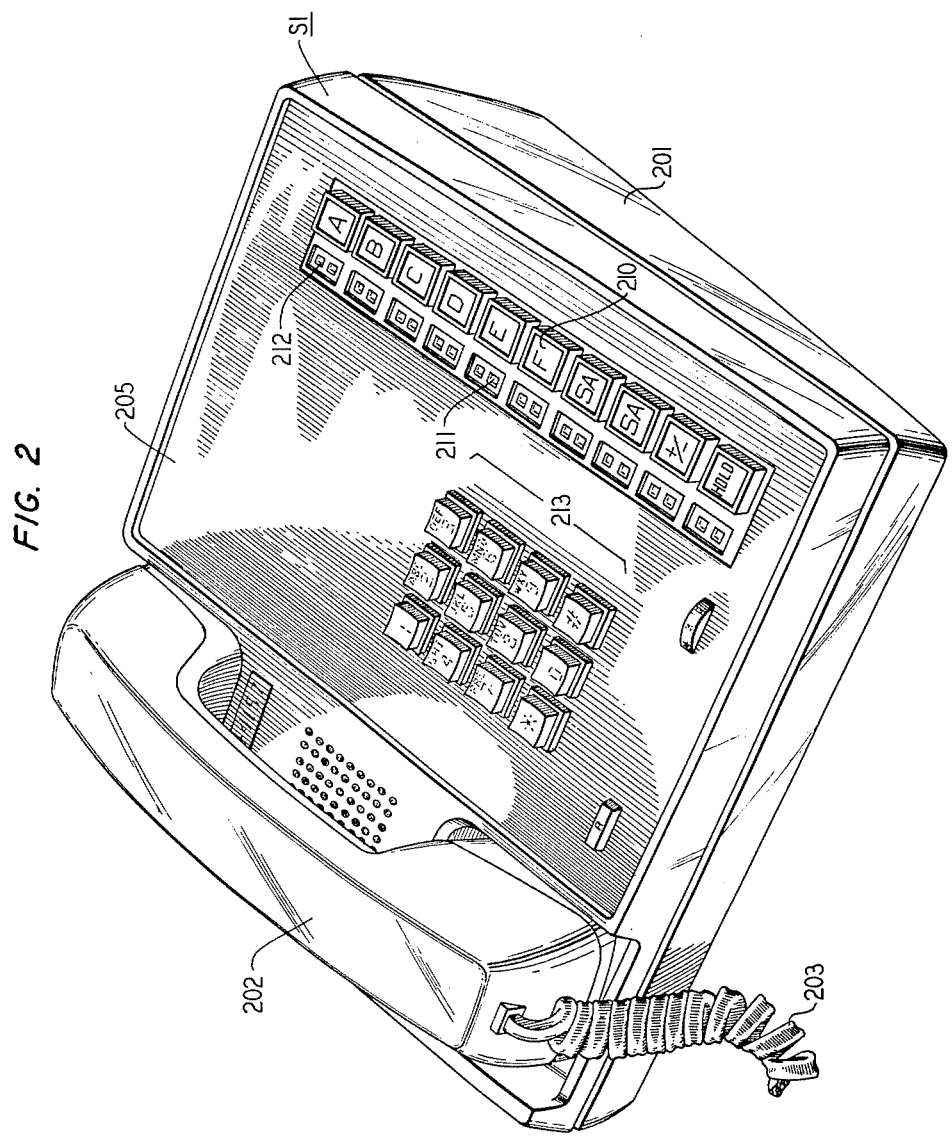
FIG. 2 shows a pictorial representation of a multibutton electronic telephone station set (MET)

This feature provides a red I-Use LED, such as LED 212, FIG. 2, associated with each line access button (system access, pooled facilities access, personal line access, automatic intercom, and call coverage). When off-hook, this LED indicates the line to which the station is connected. When on-hook, this LED indicates the line to which the station would be connected upon going off-hook.

LINE STATUS INDICATION

Call status indications are given by means of a green status LED, such as LED 211, FIG. 2, associated with each line access button (system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

AUTOMATIC INTERCOM

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may answer the call by depressing the automatic intercom button and going off-hook.

CALL COVERAGE

Call coverage is associated with a group. Each station has the option of being a sender into a given group. As a sender, that station's calls may be answered by coverage buttons associated with that group. In addition, each station has the option of being a coverage position for one or more groups — one equipped with a COVR button (or buttons) to answer calls directed from senders into the group (or groups). The status LED associated with a COVR button at each coverage station flashes whenever a station-to-station or attendant extended call is ringing at a sender station into the group. Call coverage is provided to personal line calls only if the principal station (the single station designated principal owner of that personal line) is a sender for the group. If a coverage station answers the call by depressing COVR and going off-hook, the associated status LED will indicate busy and all other COVR buttons will go idle (free to track new calls). The sender station whose call was answered will also receive a busy status indication on the line that was ringing, and it may bridge onto the call at any time by selecting that line.

If two or more eligible calls are ringing within the coverage group, the first coverage button of this group on a station will track whichever call was first to start ringing, the second coverage button of this group on the same station, if it exists, tracks the second call, et cetera. If calls directed to a station have no idle button appearance on which to terminate, busy tone will be given to the caller and this feature will not be invoked.

A station may cover for several groups by having a separate call coverage button for each group; however, a station can only send into one group. Each coverage group may have up to eight coverage positions (i.e., eight coverage buttons may be defined for any given group).

RING TRANSFER

Ring transfer is accomplished by equipping any sender station into a Call Coverage group with a RING TRFR button to transfer audible ring to predetermined Forwarding Destination stations having coverage buttons for the associated group after a single burst of ringing. Depressing the RING TRFR button will activate this feature and light the button's status LED. Once activated, the feature will transfer ringing on any future call directed to the station. The feature is deactivated by a second push of the RING TRFR button. Except for the audible ring at the Forwarding Destinations, such calls are treated exactly as with basic Call Coverage. Any or all stations having coverage buttons for the group may be designated as Forwarding Destinations for this feature as well as Call Coverage on Busy and Call Coverage on Don't Answer.

Any sender station into a Call Coverage group may elect to have this feature. Calls directed to an idle button appearance on the sender station, while that station is busy on another line, will start ringing at predetermined Forwarding Destination stations for the associated group after a single burst of ringing at the sender station. Calls directed to the sender station and left unanswered for 1 to 15 rings (option) will transfer ringing to predetermined Forwarding Destination stations for the associated group. Except for the audible ring at the Forwarding Destinations, such calls are treated exactly as with basic Call Coverage. Any or all stations having coverage buttons for the group may be designated as Forwarding Destinations for this feature as well as Call Coverage on Don't Answer and Ring Transfer.

PLUS-MINUS CONFERENCE

By means of the plus/minus button, any station user may combine up to four separate calls into a single conference call — provided no more than two outside calls are involved. The conference may be established by placing and holding each individual call and then adding them together upon reaching the final party. Alternatively, idle lines may be added directly to the active call. Adding a held or idle line to an active call is achieved by depressing the plus/minus (+/−) button and then depressing the held or idle line button. All line appearances associated with an active conference have busy status and active I-use (red LED) indications. Any attempt to add a sixth station to the conference will be ignored by the system.

The station user may hold a conference (without breaking the talking path between the held parties) by depressing the HOLD button, and may reenter a held conference by depressing the line button associated with any of the held parties. The originator of a conference may selectively drop an active conferee by depressing the plus/minus button and then depressing the line button of the party to be dropped. Hanging up or selecting another line while active on a conference will terminate the station user's participation in the conference and transfer supervision to other internal stations associated within the conference. If no other internal station is available to assume supervision, the call is terminated unless there is a progress tone (ringback, busy, reorder) on the call.

The status LED associated with the plus/minus button is lighted whenever the plus/minus button is activated and is extinguished by any subsequent line button depression — including plus/minus and the switchhook.

DISTINCTIVE ALERT

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time.

MANUAL EXCLUSION

This feature allows the station user equipped with an exclusion button to exclude the answering position and others from bridging onto an existing call and also drops those stations already on the call. This feature may be cancelled manually by a second depression of the exclusion button permitting bridging, or canceled automatically by going on-hook. The manual exclusion status LED is lighted steadily whenever the feature is active on a nonheld call. When the call is held, exclusion remains in effect and the status LED of the exclusion button winks until the call is reentered by the holding party. This feature can be applied to only one call at a time. Stations excluded from a call hear silence and can receive no I-use indication on the excluded line. After this feature is activated, the controlling station may use the conference feature to add selected internal stations into an "excluded" outside call; however, other stations can not add any parties to this call.

PERSONAL LINE ACCESS

This feature provides a communications channel between a station user and a dedicated outside line via the switching network. Unlike pooled facilities, which can also be accessed by dial codes, personal lines are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

POOLED FACILITIES — BUTTON ACCESS

Upon depressing a pooled facilities access button and going off-hook, the station user is connected to an idle line facility belonging to a common pool of outside lines (e.g., CO, FX, WATS, et cetera). The status and I-use LEDs associated with the pooled facilities access button will light steadily, and the station user will be free to complete the call. If no idle facilities are available (facilities busy indication), a user's attempt to originate will simply be denied and the I-use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

FACILITIES BUSY INDICATION

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

POOLED FACILITIES — DIAL ACCESS

Upon selecting an idle system access button and dialing the appropriate access codes (9 or 10X), a station user will be connected to an idle line facility belonging to a common pool of outside lines (e.g., CO, FX, WATS, et cetera). The status and I-Use LEDs associated with the system access button will be lighted, and the station user will be free to complete the call. If no idle facilities are available, the user's attempt to originate will be denied and reorder tone will be given. This feature is intended for nonbutton sets and MET sets not provided with an appropriate pooled facility button.

PRIME LINE PREFERENCE

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

RINGING LINE PREFERENCE

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be canceled on any subsequent call until the user returns to the on-hook state. If ringing ceases while the station user is still on-hook, line preference reverts to whichever option is applicable — no line or prime line.

STATION CALL TRANSFER

By means of the plus/minus button, any station user may transfer any call to any station. Transfer may be achieved by holding the call to be transferred, placing a call to the desired station, depressing the plus/minus button, depressing the button associated with the held call, and then hanging up. Alternatively, an idle button may be plussed directly to the active line, after which the desired party may be dialed. A call transferred from one station to another and left in the ringing state for more than 120 seconds will be terminated if the transferring station is no longer active. This prevents an unmonitored transferred call from indefinitely tying up the system and the CO facilities.

STATION-TO-STATION CALLING

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611 issued May 2, 1972 in the name of Knollman et al., and in U.S. Pat. No. 4,046,972 issued Sept. 6, 1977 in the name of Huizinga et al., which patent also shows the multibutton electronic set. The switching network and line circuits shown in FIG. 1 can be of the type shown in U.S. Pat. Nos. 3,991,279 and 3,991,280, both issued Nov. 9, 1976, and in copending application of J. J. Shanley, Ser. No. 846,162, filed on Oct. 27, 1977.

GENERAL DESCRIPTION — POOLED LINE CONTROL

Feature I — Pooled Facilities Access (PFA) and Facilities Busy Indication

A MET station may have the following access to collections of lines (1) for any predefined collection of lines, there may be a single button appearance on the MET set such that to originate a call on one (arbitrary) line in that pool, the user simply goes off-hook and selects the single Pooled Facilities Access button. The system selects an idle line and connects the station to it through the network for origination.

(2) When all lines in the pool are busy, the stations which have "PFA" buttons for that pool but are not currently using a line from that pool (i.e., have idle PFA buttons) will be informed of that condition by having the status LED light steady. When a line becomes idle, the status LED is extinguished. The feature of showing the busy status to all stations with Pooled Facilities Buttons for the pool is called Facilities Busy Indication.

Feature II — Flexible Line Arrangements for Pooled and Personal Access

A single CO line may be arranged in such a way as to provide flexible usage depending on traffic conditions. In particular:

(1) The line may be installed on one or more MET stations as personal 2-way lines. During normal traffic conditions, the line will not be in use unless one of the METs with an appearance of the line uses it to place an outgoing or receive an incoming call.

(2) The line may also be installed as part of a line pool in such a way that METs may use it by selecting a "PFA" button for the pool. However, this line will not be the one selected by the system unless these two conditions hold:

(a) the line is not currently in use;
(b) all other lines in the pool (those not having the dual use characteristic) are busy.

(3) Lines installed only in the pool and not having personal 2-way appearances at stations may have any desired priority selection order assigned to them. In particular, the highest priority group can be arranged in an order opposite to the selection order used by a central office which treats the lines as the Listed Directory Number hunt group.

DETAILED DESCRIPTION

In the status memory (FIG. 1, item 1b) there is stored for each button on each station set the following information:

(a) the instantaneous state of each LED (on/off) for the two LEDs associated with the button;
(b) the long term state of each LED (flash, wink, on, off). This is called the Station Button Status (SBS) for the status LED and the Station Button Iuse (SBI) for the Iuse LED.

Also, for each station set, there is a status memory location for recording:

(c) the last detected instantaneous state of the station's switch-hook and buttons;
(d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switchhook and buttons.

The returned data is compared with that in (c) above and if there are any changes, records these in a temporary buffer for that station. At a different time, another processor action called "Button Processor" picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical form, e.g., a value of 1 identifies a personal line button, a value of 2 identifies a pooled line button, etc.

For a speech-type button (e.g., system access, autointercom, personal line, pooled line, call coverage, etc.), there are four possible states which will be shown to the user on the status LEDs: Namely, busy — (LED steady on), idle — (LED dark), ring — (LED flash), hold — (LED wink).

This information is stored in the status data memory (16-2 in FIG. 1) coded in numerical forms. For a non speech-type button like message-waiting, the same data format is used although the valid states may reduce to two (busy and idle).

As described early, the scan routines in the system detect and report a button push by the MET user to a buffered area to wait for the process routines to process. When such a change is processed by the process routines, the button identification information, SBID, stored in 16-2 is first checked, then the button status information, SBS, stored in 16-2 is checked. The processor is thus able to interpret the button push to a specific user command and uses the proper programs stored in 16-1 to process the change. For example, button selection of (1) an idle (from SBS) speech-type (from SBID) button implies call origination requiring the associated facilities.

(2) a ringing (from SBS) speech-type (from SBID) button implies answer a ringing call.

There are five translation tables in the system (FIG. 1, 16-2) which define the relationships among lines, pooled facilities access buttons and personal (single) line access buttons. A name XYZ [j] refers to a specific address in the status memory for recording information for the $j^{th}$ hardware facility that uses that type of information.

(1) LSPT: Line-Station Pointer Table

LSPT [i] contains two pieces of data:
(a) The station index of one station having a personal (single) line button appearance for the $i^{th}$ line in the system.
(b) The button number on that station where the line appears.

If no station has an appearance of that line, the entries for LSPT [i] are zero. The range of i is such that each line in the system has a unique index i, called the *line index*, where $i > 0$.

(2) LGIT: Line Group Index Table

LGIT [k] contains one piece of data:
(a) The index of the first line to be used when selecting a line in pool k.

There is an entry for each *pool number k*. If there are no lines in the $k^{th}$ pool, LGIT [k] = 0. Also, $k > 0$.

(3) LGPT: Line Group Pointer Table

LGPT [i] contains three pieces of data:
(a) Whether or not line i is in a line pool;
(b) If line i is in a line pool, which pool (pool number) it is in;

(c) If line *i* is in a line pool, another line index *j* is given to identify another line in the same pool. All lines in a given pool are chained together in a singly linked chain in LGPT. The last line in the pool is identified by a special data entry to indicate end of chain.

There is an entry in LGPT for each possible line in the system. Also, lines in a given group are not chained in an arbitrary order but, instead, are chained in the order they are to be seized by the system. LGIT [*k*] points to the first line to be used in pool number *k*. From the entry in LGPT for that line, the line index described in (c) identifies the second line in pool number *k*, and so forth.

(4) LPLDG: Line Pool Dial Group

LPLDG [*k*] contains two pieces of data:
(a) The station index of one station having a pool facility access button for line number *k*.
(b) The button number on that station where the pool access appears.

There is an entry for each pool number *k*. If there are no pooled facility access buttons installed on any METS for that pool, the entries are zero.

(5) SBID: Station Button ID Table

SBID [*i,j*] contains four pieces of data *for a button j on station i which is of the type Pooled Facilities Access* button.
(a) An identifier which tells which pool number is to be accessed;
(b) The station index of another station which has the same kind of button for the same pool of lines;
(c) The button number on the station identified in (b);
(d) An identifier which defines the button as being of the type Pooled Facilities Access button.

The station buttons which are Pooled Facilities Access buttons for the *same* line pool *k* are to be chained together using (b) and (c) above in a singly linked continuous chain except that
(i) the start of the chain is at the station identified in LPLDG [*k*];
(ii) the last station in the chain is flagged as such and contains the identifier *k* instead of entries (b) and (c) above.

SBID [*i,j*] contains four pieces of data *for a button j on station i which is of the type Personal (single) line appearance.*
(a) An identifier which is the line index *t* of the required line;
(b) The station index of another station which has an appearance of the same line;
(c) The button number on the station identified in (b);
(d) An identifier which defines the button as being of the type Personal (single) line.

The station buttons which are Personal (single) line appearances for the same line must be chained together using (b) and (c) above in a singly linked continuous chain except that
(i) the start of the chain is at the station identified in LSPT [*t*], where *t* is the line index of the particular line identified in (a);
(ii) the last station in the chain is flagged as such and contains the line index *t* for the particular line instead of entries (b) and (c) above.

There are several *status records*, for dynamic call activity, which are also required to implement these features.

(6) LS: line state

LS [*i*] contains the following information of relevance to these features:
(a) The line *busy* (in use, ringing, maintenance busy) or *idle* (available for a new incoming or outgoing CO call) condition.

(7) SBLP: Station Button Link Pointer

SBLP [*i,j*] contains the following relevant information:
(a) If button *j* on station *i* is active (i.e., associated with an active call) then the entry contains a non-zero number identifying the network link associated with the active call; otherwise, the entry is zero.

Installing a group of lines to form a pool with the properties described in Feature I (1) For the first line in pool number *k*, put the line index in LGIT and the required entries in LGPT for that line index.
(2) For each successive line in pool number *k*, make the required entries in LGPT.
(3) For the first MET button which has a Pooled Facilities Access button for pool number *k*, make the required entries in LPLDG and SBID for that station and button.
(4) For each successive MET button for this same pool, make the required entries in SBID.

Figure 3:
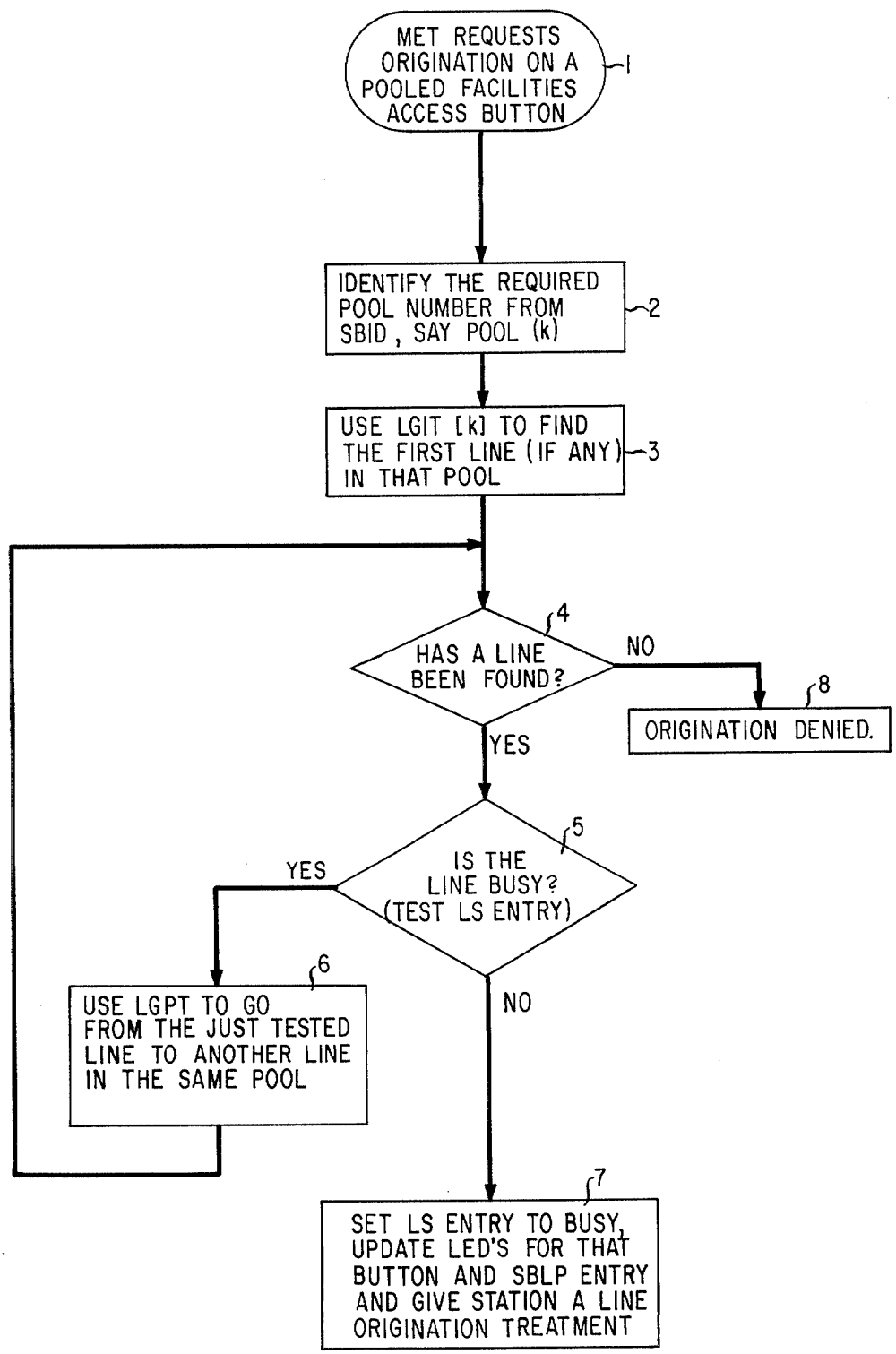
FIGS. 3–6 show a typical flow chart of the claimed feature operation.
Figure 4:
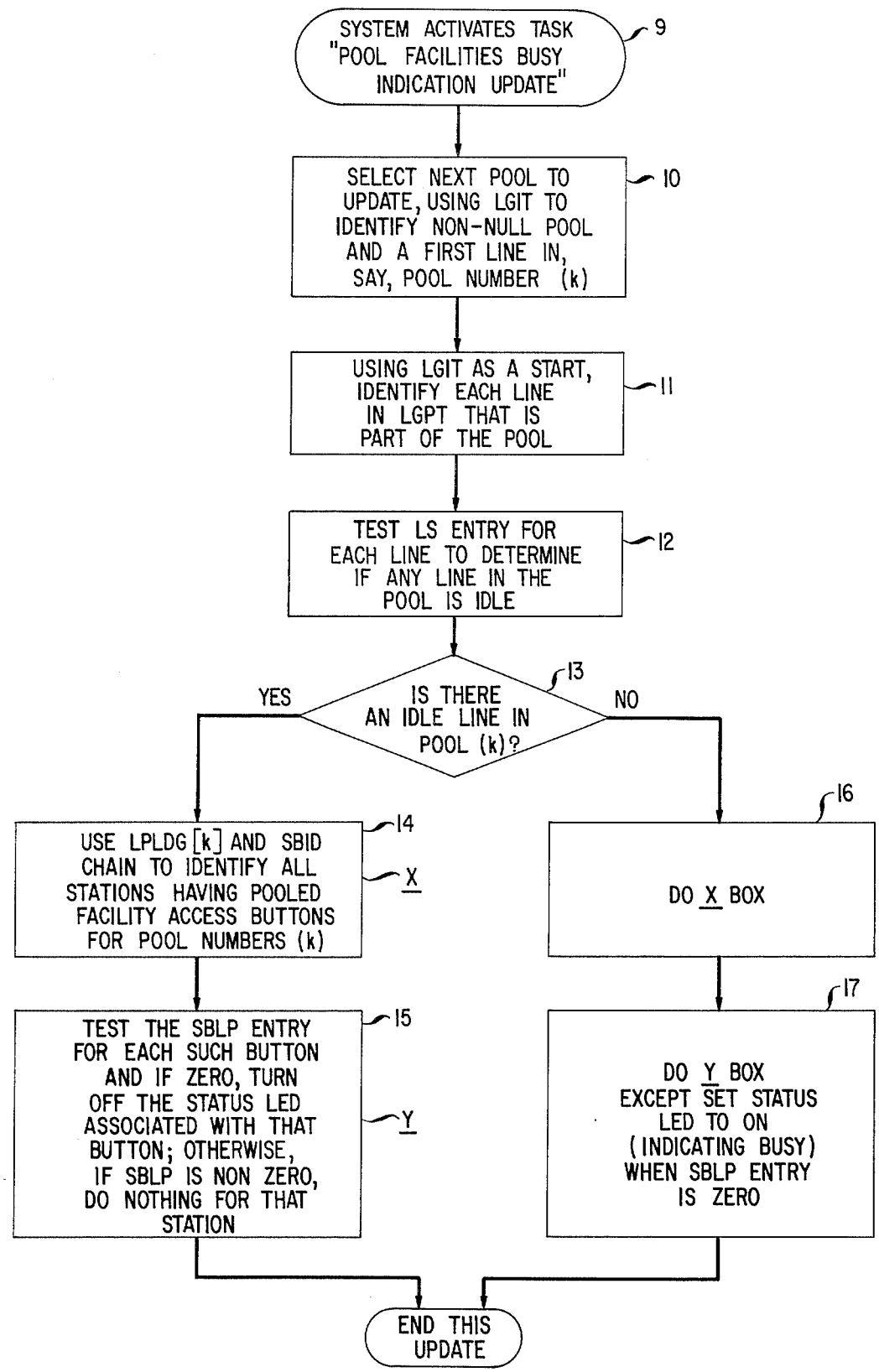

System actions are shown in detail in FIGS. 3 and 4.

Installing a line to have the properties described in Feature II (1) Install the line in the translation table LGPT in such a way that it is the last member of the chain of lines in that pool with which the line is to be associated in heavy traffic circumstances.

If there are several lines which are to have the properties, all are installed to form a subchain at the very end of the chain: that is, they are the $n-j, n-j+1, \ldots, n^{th}$ lines in the chain of *n* lines, when there are $j+1$ such lines. This establishes the line pool.

(2) For each Personal (single) line button appearance, install it in translation tables LSPT and SBID as appropriate for this type of line. There are no additional constraints.

(3) For each Pooled Facilities Access button for the line pool, install the button translation in SBID (and the required entry in LPLDG for one of the button appearances). There are no additional constraints.

Figure 5:
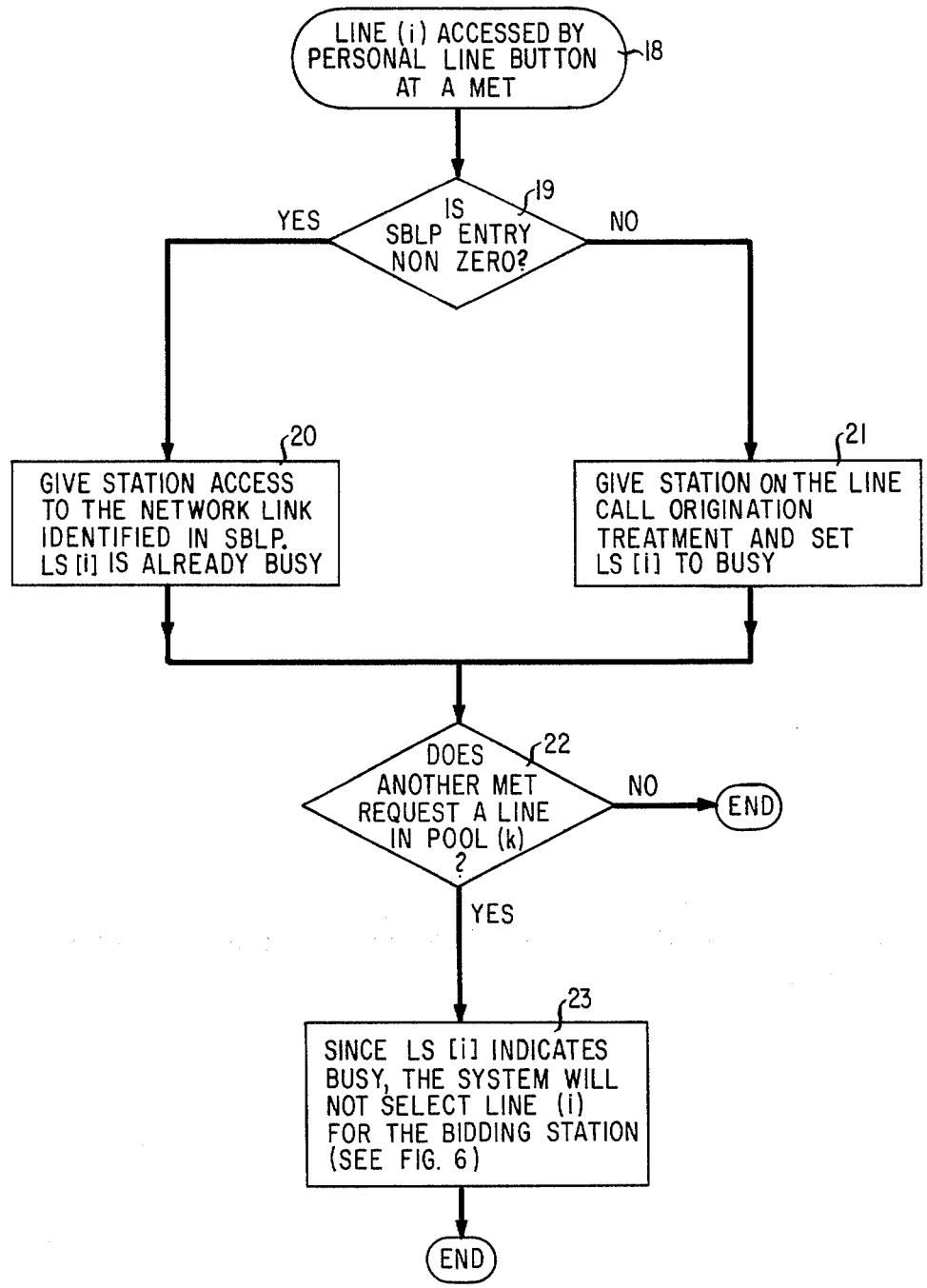

Assume line *i* has been installed as described above in the translation tables and is associated with pool number *k*. Let there be one or more Pooled Facilities Access buttons on METS for pool number *k*, and one or more Personal (single) line button appearances on METs for line *i*. Then the charts in FIGS. 5 and 6 can be used for a more detailed system operation discussion.

Figure 6:
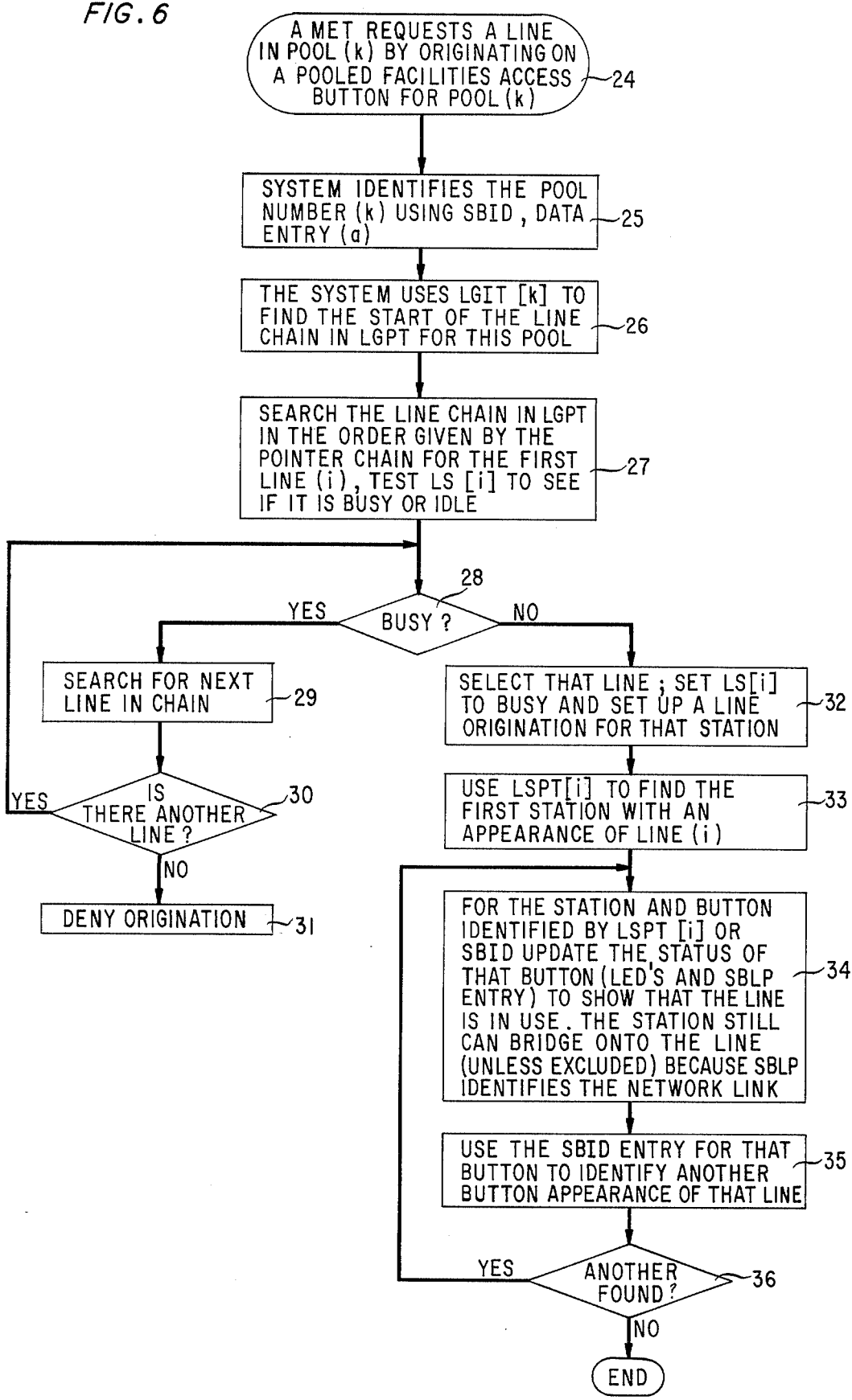

The system converts a button push to the access of an available link in the line pool as shown in boxes 25, 26 and 27 of FIG. 6 under control of the processor. A first priority of a set of lines in a pool is implemented by installing them as the first *n* lines in the pool as described above. The first idle line in a set of idle lines in the first pool of lines is available for connection to an enabling station as shown in FIG. 6, boxes 24–28 and 32, with the actual control of the switching network being done by the processor.

A second priority is assigned to the personal lines which will be the $(n+1)^{th}$ line in the pool as described above. FIG. 6 illustrates the manner in which a second priority line is selected by the processor. For priorities of lines lower than 2 assign a first group of lines $n$, assign a second priority of lines $(n+1)$ to $(n+1+m)$ and for a third priority assign $(n+1+m+1)$ to $(n+1+m+1$ to $p)$ in the line pool and use the processor under control of FIG. 6 to cycle through each pool to obtain an idle in the set before going on to the next set.

Visual signals are controlled as shown in FIG. 4 and are under control of the processor as discussed above. The changing of visual signals for different stations is shown in FIG. 4. For using the same station LED for system availability FIG. 6 shows the control, and which is performed by box 34.

The priority of lines within a line pool is controlled in the establishment of a line pool by the value $n$ assigned to the line, and the selection of the line is shown in FIG. 6.

Of course it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. A line pool control arrangement for use in a communication system having a plurality of stations, each station having access to any one of a number of lines serving said system by the momentary operation of a button at a telephone station set having a plurality of such buttons, said line pool control arrangement comprising means responsive to the enabling of certain ones of said buttons at each said station for enabling a communication connection to one line in a pool of said lines associated with said enabled button, means for assigning a first priority to a set of said lines in said line pool such that when a pool line button is enabled at any said station only those idle lines in said set of lines having a first priority can become connected to said enabling station, means for assigning a second priority to certain other of said lines outside said line pool such that when a pool line button is operated at any said station and all of said lines in said line pool set of lines are busy a communication connection is established to an available one of said other lines having said second priority.

2. The invention set forth in claim 1 further comprising means for assigning a third priority to certain of said other lines outside said pool such that when a pool line button is operated at any said station and all of said lines having said first or said second priority are busy a communication connection is established to an available one of said other lines having said third priority assigned thereto.

3. The invention set forth in claim 2 further comprising means for providing visual signals to all stations having button access to said pool of lines, and means for changing said visual signals such that when at least one such line is available a first indication will be given and when no lines in said set of pool lines are available a second indication will be given.

4. The invention set forth in claim 3 wherein said station buttons each have associated therewith a visual indicating device showing the enabled or released status of said button at said station, and wherein said visual signal means includes said status indicating device.

5. The invention set forth in claim 1 wherein said lines in said pool of lines having said first priority are each assigned a high to low priority from 1 to $n$, means within said 1 to $n$ priority for determining an order of selection of a next available line by a central office, and means controlled by said enabling of a pool line button at a station for connecting said station to a selected idle one of said lines in said pool, said selected idle line being determined in an order of selection with said 1 to $n$ priority opposite to the order of selection of said central office line.

6. The invention set forth in claim 1 wherein said lines in said pool of lines are lines shared by several stations; and wherein said other lines are lines which are used as personal single lines.

7. In a communication system having a plurality of stations each having the capability of communicating with other stations over communication links internal to the stations as well as having the capability of communicating with stations external to the system over communication lines extended between the system and a central source, an arrangement for controlling pooled line access, said arrangement comprising means responsive to the enabling of certain ones of said buttons at each said station for enabling a communication connection to a pool of said lines associated with said enabled button, means for assigning a first priority to a set of said lines in said line pool such that when a pool line button is enabled at any said station only those idle lines in said set of lines having a first priority can become connected to said enabling station, means for assigning a second priority to certain other of said lines outside said line pool such that when a pool line button is operated at any said station and all of said lines in said line pool set of lines are busy a communication connection is established to an available one of said other lines having said second priority.

8. The invention set forth in claim 7 wherein said lines in said line pool are external lines.

9. The invention set forth in claim 8 wherein said lines in said other lines are all external lines.

10. The invention set forth in claim 9 further comprising means for assigning a third priority to certain of said other lines outside said pool such that when a pool line button is operated at any said station and all of said lines having said first or said second priority are busy a commmunication connection is established to an available one of said other lines having said third priority assigned thereto.

11. The invention set forth in claim 10 further comprising means for providing visual signals to all stations having button access to said pool of lines, and means for enabling said visual signals such that when no lines in said set of pool lines are available a visual indication is given.

12. The invention set forth in claim 7 wherein said lines in said pool of lines having said first priority are each assigned a priority from 1 to $n$, means within said 1 to $n$ priority for determining an order of selection of a next available line by a central office, and means controlled by said enabling of a pool line button at a station for connecting said station to a selected idle one of said lines in said pool, said selected idle line being determined in an order of selection with said 1 to $n$ priority opposite to the order of selection of said central office line.

13. A communication system having a plurality of stations, each station having a plurality of buttons operable to establish communication connections to said station, and wherein each station has communication access to a number of lines, said system comprising means for grouping some of said lines into a first line pool, means for grouping other of said lines into a priority set of lines, means for assigning one of said buttons at at least one of said stations as a first pooled line access button, means responsive to the enabling of said first pooled access button at any station having assigned thereto a first pooled line access button for enabling a communication connection between said station and a first available one of said lines in said line pool, and means responsive to the enabling of said first pooled line access button at any station having assigned thereto a first pooled line access button for inhibiting said last-mentioned means and for enabling a communication connection between said station and a first available one of said lines in said priority set of lines when all of said lines in said first line pool of lines are determined busy.

* * * * *